(12) United States Patent
Wilde et al.

(10) Patent No.: US 7,156,981 B2
(45) Date of Patent: Jan. 2, 2007

(54) ITFM EXTRACTION OF OIL SEEDS

(75) Inventors: Peter F. Wilde, Sowerby Thirsk (GB); Ronald E. Skinner, Cornwall (CA); Richard F. Ablett, Charlottetown (CA)

(73) Assignee: Bio Extraction Limited, Toronto (CA)

( * ) Notice: Subject to any disclaimer, the term of this patent is extended or adjusted under 35 U.S.C. 154(b) by 676 days.

(21) Appl. No.: 10/133,020

(22) Filed: Apr. 26, 2002

(65) Prior Publication Data

US 2002/0189976 A1 Dec. 19, 2002

Related U.S. Application Data

(63) Continuation-in-part of application No. 09/890,043, filed as application No. PCT/GB00/00125 on Jan. 20, 2000, now Pat. No. 6,890,424.

(30) Foreign Application Priority Data

Jan. 25, 1999 (GB) ................................. 9901617.2
Mar. 5, 1999 (GB) ................................. 9905054.4

(51) Int. Cl.
*C11B 1/10* (2006.01)
*C10G 1/04* (2006.01)
*B01D 11/02* (2006.01)

(52) U.S. Cl. ....................... 208/311; 208/320; 208/313; 208/315; 210/634; 554/12; 554/14

(58) Field of Classification Search ................ 208/311, 208/313, 315, 320, 340
See application file for complete search history.

(56) References Cited

U.S. PATENT DOCUMENTS 6,860,998 B1 * 3/2005 Wilde .......................... 210/634
6,890,424 B1 * 5/2005 Wilde .......................... 208/311

FOREIGN PATENT DOCUMENTS

WO WO 01/10527 A1 * 2/2001

* cited by examiner

*Primary Examiner*—Tam M. Nguyen
(74) *Attorney, Agent, or Firm*—Koppel, Patrick & Heybl; Michael J. Ram

(57) ABSTRACT

A process for the producing edible protein-containing meal for human and animal consumption and high quality food grade oils from oil seed using iodotrifluoromathane as the solvent is shown. The meal has a significantly improved level of dietary available (absorbable) protein. The process involves the preparation of protein isolates by a procedure which is conducted at room temperature, thus decreases protein degradation and denaturing which is caused by elevated temperatures. The process also provides for extraction of substantially all oils and fats, which interfere with the formation of the protein micelle, from the protein meal providing a cleaner, purer product with high levels of absorbable protein. Such protein isolates can then be used as such or added to formulated foods in order to increase the total protein content of that food. The protein produced and the oils recovered have compositions which are also unique and unobtainable by prior processing methods.

11 Claims, No Drawings

ITFM EXTRACTION OF OIL SEEDS

This is a continuation-in-part of a) U.S. Ser. No. 09/890,043, filed Oct. 2, 2001, now U.S. Pat. No. 6,890,424, which claims benefit from PCT/GB00/00125, published as WO 00/43471, July 27, 2000, based on British Patent Application Ser. No. 9901617.2 filed Jan. 25, 1999, now GB 2,276,392 and British Application Ser. No. 9905054.4 filed Mar. 5, 1999, now GB 2,345,915, and b) U.S. Ser. No. 10/049,145, filed Jun. 17, 2002, now U.S. Pat. No. 6,860,998, which claims benefit from PCT/GB00/02957, published as WO01/10527, Feb. 15, 2001, based on British Patent Application SN9918436.8 filed Aug. 5, 1999, now GB 2,352,724 and c) claims benefit from British patent application 01/069723 filed Mar. 20, 2001, now PCT/GB02/01332 published as WO 02074886.

The present invention is directed to the isolation of superior, high purity, bright proteins from oilseed protein, the product having a significant increase in absorbable protein over that available from prior materials sources. At the same time, the process described herein provides a cleaner edible or industrial oil from the same seed and provides the capability of removing fatty acids as well as glucosinolates, which have toxic decomposition products, from that oil. Still further, the process provides a method of separating out various constituents of the recovered extractables, thus allowing isolation of components of the oil.

FIELD OF INVENTION

The major oil seeds include soybean, cottonseed, peanut, sunflower, coconut, groundnut, flax (for linseed oil), olive and rape (brassica), and canola which is a hybrid of rape seed. Rape and canola are used interchangably herein as the processing is the same. Referring to rape, depending on the intended use, the composition of the desired oil will vary. Eurucic acid, a 22-carbon fatty acid, is desired to be present in high concentrations for industrial uses, sometimes as high as 45%, and low (less than 2%) or zero concentration for edible canola oils. A typical rape (or canola seed) has 33–50% oil and 8.5–20% moisture upon harvesting and yields 29.5 to 57.5% protein. Oil content of the meal can be reduced to about 15–25% by mechanical processing (pressing) and then reprocessed to 3% oil content. The terms "seed" and "bean" will be used interchangeably as these terms are used alternatively for the various feed materials. Further, the process described herein is usable on oil containing seeds and/or beans.

The protein recovered after oil removal may be used in applications typical for protein isolates, such as, protein fortification of processed foods, emulsification of oils, body formers in baked goods and foaming agents in products which entrap gases. The protein isolate may also be formed into protein fibers, useful in meat analogs, and may be used as an egg white substitute or extender in food products where egg white is used as a binder or as a wheat gluten substitute or extender in wheat-based products. While some of the protein recovered from these seeds are approved for human consumption, other proteins, particularly canola protein, are not presently approved for other than animal feed.

Present day commercial oilseed processing techniques emphasize the production of bright, super degummed oil and result in the removal from the oil of gums, soapstocks, bleaching clays and pigments, which are by-product materials and disposed of or added back to the meal left after crushing the oil seeds to remove the oil, increasing the quantity of such materials left after oil extraction. However, the presence of these fats, whether left after oil extraction or removed from the oil and added back to the oil seed meal, results in a situation where it is impossible to extract protein isolates containing in excess of about 90% protein from such meals using environmentally sensitive isolation techniques due to the amount of residual fats.

Protein levels which can be achieved with conventional processing techniques generally do not exceed about 70 to 75 wt % and their functionality in food systems is impaired by the presence of the fat. In addition, the presence of the fat in the dry protein product can lead to rancidity and other fat-related problems, including poor solubility, caking etc., as well as discoloration resulting from coprocessing of pigments in the meal with the fat. Still further, the presence of the fat interfers with the ability to separate the protein from the meal.

Oil seed plant breeding programs have been established for the purpose of improving the yield of oil from the oil seeds. Cultivars have been developed, for example for canola (rapeseed), which are higher yielding in terms of oil and have reduced toxic or undesirable dietary constituents. However, such enhanced oil production has the effect of increasing the proportion of fat which is present in the oil seed meal as a result of the addition of the by-products from the oil refining to the oil seed meal.

While it is possible to at least partially remove such fats from the oil seed meals by extraction with organic solvents, such as hexane, the use of such organic solvents requires elevated temperatures to completely remove all of the solvent This results in denaturing of the protein, thereby reducing the nutritional value of the product, and, in addition, gives rise to an environmentally unfriendly disposal and recovery problem.

BACKGROUND TO THE INVENTION

Growing world shortages of food and feed, as well as an expanding world population has expanded the need for new, improved and increased food sources. Efforts are being directed to increasing the protein content of foods as well as increasing the available protein contained within those foods.

Referring to rapeseed and canola as an example, the harvested bean or seed typically has about 8% or more moisture content. Several extraction methods, including mechanical (pressing), solvent, enzymes and supercritical $CO_2$ extraction, are used to remove the oil which is typically about 33% to about 50% of the harvested bean. Pressing is a simple process and has a low capital investment cost but suffers from high operating cost for power, significant equipment wear and tear, and labor costs. In addition, temperature increases due to mechanical working of the bean can result in quality degradation of the oil and meal. There is also a significant amount of residual oil left in the meal (about 15% to about 25%).

Solvent extraction is a more efficient method of oil removal. Hexane has had extensive use in the edible oil processing industry to remove the oil from the soy bean or canola seed. However, the rate of extraction is dependent on the meal flake surface area, temperature, the solvent selected and the moisture content of the seed (or bean). Hexane is typically applied to the pre-pressed seed but may also be applied after pressing of the cake. The extracted meal is then heated to drive off the hexane. The use of the solvent and heating tends to denature at least some of the protein rendering it insoluble. Also, the extracted meal still has from about 1 to about 4% by weight oil and may still have some residual hexane.

The oil is then separated from the solvent by heating the solution or steam injection. This procedure again suffers from oil quality degradation as a result of the use of elevated temperatures. Also, for food use, residual solvent remaining in the oil is a significant negative factor, requiring additional processing at elevated temperatures, which in turn further degrades the quality of the oil. For edible use, the oil must also be degummed to reduce phosphorus content. The desired product, referred to as super degummed oil, has between 10 and 30 ppm phosphorus. Crude degummed oil contains about 200 ppm as well as 0.5%–3.0% impurities of which about 2% is lecithin gums which are removed by water addition and separation. If not removed, these gums will settle out during storage, causing future processing problems.

Fatty acids are typically removed from the crude oil by saponification using sodium hydroxide to form a water soluble soap. The oil is then refined to lighten its color by removing beta-carotene and other colored constituents and deodorized using absorbents such as Fullers earth, clays, bleaching agents, steam stripping and distillation.

Supercritical $CO_2$ extraction requires the application of high pressures (80–100 bar) to $CO_2$ which is held above its critical temperature (31° C.) to maintain the carbon dioxide in a supercritical state. The seed is typically ground prior to exposure to the high pressure $CO_2$. The meal may be digested using enzymes to leave the oil behind. High pressure, super critical processing produces a fluid $CO_2$ extractant, which, because of the supercritical operating temperature and pressure, behaves like a liquid. The oil is released by lowering the pressure, which reduces the solubilization ability of the now gaseous $CO_2$. A significant deficiency of this process is the capital investment in high pressure processing and $CO_2$ recovery equipment.

Although the literature indicates many sources of plant proteins including starchy cereals (wheat, corn, oats, rye, barley, triticale, etc.), nuts, starchy legumes or lentils (field peas, chickpeas, fababeans, navy beans, pinto beans, etc.) and oilseeds (sunflower seed, rapeseed, canola, soy beans, peanuts, etc.), in general, the main source of commercial protein is the soybean. Industrial proteins separated from the source meal, normally called isolates, have protein contents of at least 90% expressed on a moisture free basis.

One process for preparing a soy protein isolate was described by Anson and Pader in 1957 (U.S. Pat. No. 2,785,155). The proteins in soy meal were dissolved using alkaline solubilization (high pH treatment), the insoluble material was removed by centrifugation and hydrochloric acid was added to the supernatant which contained the alkali-solubilized proteins. The acid precipitated the proteins isoelectrically thereby producing a highly proteinaceous product, i.e., a protein isolate. The isoelectric precipitation of soy proteins proved to be an economical and industrially practical method which has been the dominant technical approach for the preparation of protein isolates for a considerable period of time.

Sair (1959) in U.S. Pat. No. 2,881,076 disclosed an improved soy isolate of high yield, although the process still used an isoelectric precipitation step. Kraskin (1972) in Canadian Pat. No. 915,105 described an improved method for extracting proteinaceous materials using enzymes in addition to alkaline pH manipulation to solubilize maximal amounts of proteins; once this was achieved, precipitation of the proteins was done isoelectrically. Another improved process using slightly elevated temperature and pH manipulation to achieve high protein solubility was described by Calvert et al. (1973) in Canadian Pat. No. 917,995; the protein was then precipitated isoelectrically to yield a white, bland, homogeneous product. Boyer (1973) in Canadian Pat. No. 935,024 described a soy protein cheese-like curd which was prepared from isoelectrically precipitated protein; a heat step before precipitation produced a fluffy type of curd. A combination of heat and enzyme treatments was used by Hawley (1973) in Canadian Pat. No. 936,408 to produce a special protein preparation for acidic beverages and baking applications; once again the specially treated proteins were precipitated isoelectrically.

In U.S. Pat. No. 3,758,452 (Owen (1973)) a de-toxified rapeseed protein is prepared from press cake solubilized with sodium chloride. After particulate matter had been removed, the salt soluble protein was precipitated isoelectrically by the addition of acid. In a further example of this type of technology, Flink and Christiansen (*The Production of a Protein Isolate from Vicia faba Lebesm.-Wiss. u Technol.* 6: 102–106 (1973)), describe the preparation of a fababean (*Vicia faba*) protein isolate by protein solubilization at pH 8 to 10 and then isoelectric precipitation of the protein.

In the prior discussed procedures, the proteins are solubilized by alkaline or salt extraction with the treatment in some cases being enhanced by increased temperature, enzyme activity and/or salt addition. However, regardless of the solubilization scheme, isoelectric acid precipitation is used to separate the desired product. Furthermore, in order to efficiently produce a reasonable level of solubilized protein an alkaline pH step is normally required. However, there are some concerns regarding nutritive value of protein isolates prepared by alkaline solubilization and acid precipitation. deGroot and Slump (*Effects of Severe Alkali Treatment of Proteins on Amino Acid Composition and Nutritive Value, Journal of Nutrition,* 98: 45–56 (1969)), reported that alkali treated soy protein isolate contained the amino acid derivative lysinoalanine (LAL) which was absorbed poorly in the gut of growing animals. In fact, there was a negative correlation between LAL level in the diet and net protein utilization (N.P.U.) values. Then Woodard and Short, *Toxicity of Alkali-Treated Soy Protein in Rats, Journal of Nutrition* 103: 569–574(1973), confirmed the presence of LAL in alkali treated soy protein and showed an apparent correlation between LAL level and nephrotoxic reactions in rats. The common decrease in the protein efficiency ratio (P.E.R.) of soy isolates, when compared to soy flour and concentrate, is probably due to the formation of LAL on akali/acid processing and hence reduction of the essential amino acid lysine. Sternberg et al.(*Lysinoalanine: Presence in Foods and Food Ingredients, Science,* 190: 992–994 (1975)), who found high levels of LAL in certain samples of sodium caseinate, dried egg white solids, and various processed foods as well as in foods heated under non-alkaline conditions. Additional concern over LAL in food systems has been generated by Gross (*The Chemistry and Biology of Amino Acids in Foods Proteins, Agrochemistry Abstract* #32 (1975), First Chemical Congress of the North American Continent, Mexico City), who showed that LAL can also cause the reabsorption of a developing foetus in the uteri of rats and rabbits. Therefore, there is a definite need for preparing protein isolates without alkali and heat treatments to reduce the generation of questionable amino acid derivative.

U.S. Pat. No. 4,169,090 describes a process for forming protein isolates which comprises subjecting a protein source material to a salt solution. The protein source material is first comminuted to provide an average particle size of between about 10 and about 800 mesh, usually less than about 200 mesh. This is followed by cell disruption and the physical removal of some non-proteinaceous material by screening, grinding, milling, air classifying, etc. The protein fraction (usually a dry flour or concentrate) is then mixed into a solution containing only water and an appropriate food grade salt (sodium chloride, potassium chloride, calcium chloride, etc. which has a normal pH of from about 5.0 to about 6.8) with agitation at 15° to 35° C. The insoluble particulate matter (usually cellular debris and perhaps starch granules) is removed from the solubilized proteins by settling, filtering, screening, decanting or centrifuging. The salt concentration is usually in the range of 0.2 to 0.8 ionic strength depending on the particular protein, the level of salts in that source material, the particle size of that material, the specific salt used and the extraction temperature and time. The resulting extract, referred to as a high-salt protein, contains many solubilized compounds in addition to proteins. The protein solution, usually has a protein concentration of about 10 to about 100 g/l. The protein solution is then concentrated using selective membrane technique.

The ionic strength of the solution of the solubilized proteins is then reduced. Various methods can be used such as membrane separation techniques (e.g., dialysis, ultra filtration, reverse osmosis, etc.) or dilution of the high salt protein extract by addition of water. Ionic strength reduction causes the protein structures formed by the addition of salt to dissociate causing a rapid decrease in molecular weight of the protein aggregates and the generation of a comparatively low molecular weight species. The resultant particles are small microscopic spheres containing many associated globular protein molecules called "protein micelles".

In accordance with the U.S. Pat. No. 4,208,323, the yield of protein isolate which may be obtained by the prior process is increased by increasing the protein concentration of the protein solution in the extraction step while the salt concentration remains the same prior to the dilution step. Adding a washing step to the concentration steps significantly decreases the phosphorus concentration of the isolate.

U.S. Pat. No. 5,844,086 provides a further modification of the process of preparing a protein isolate starting from an oil seed meal having a fat content up to about 10 wt % of the meal. After addition of the salt solution the fat is removed from the protein solution to provide a defatted protein solution. The end product is a dried proteinaceous powder substantially undenatured and having a protein content of at least about 90 wt %.

U.S. Pat. No. 6,005,076 further improves the process to provide a purified protein isolate of high protein content from fat-contaminated oil seed meal. Centrifugation is used to reduce the moisture content of the protein solution from 70%–95% by weight to about 50%–80% by weight of the total isolate mass. This also decreases the occluded salt content of the isolate, and hence the salt content of dried isolate.

Applicant's published application WO 00/43471 is directed to a process for the extraction of fixed oils from various materials, such as seeds, using 1,1,1,2-tetrafluoroethane (HFC 134a) alone or in combination with co-solvents, at temperatures of 40° C. or above. Co-solvents include hydrocarbons, esters, ketones, chlorinated and fluorinated hydrocarbons, ethers, alcohols, etc. The oil is caused to separate from the solvent by lowering the temperature to room temperature or below, preferably 0–20° C. so the oil is no longer soluble and separates therefrom. A second of applicant's published applications, WO 01/10527, is directed to the extraction of fixed oils, fatty acids sterols, esters, natural waxes, hydrocarbons, flavors and fragrance oils and pigments from natural plant materials using iodotrifluoromethane ($CIF_3$, also referred to herein as ITFM) alone or with cosolvents, such as HFC-134 at ambient temperature or below and slightly elevated pressures sufficient to keep the solvent in a liquid state. The oils are then separated out by reducing the pressure sufficient to cause the solvent to evaporate.

DETAILED DESCRIPTION

The new process described herein provides an improved process for processing of meal from oil seed to produce edible protein for human and animal consumption having a significantly improved level of dietary available (absorbable) protein. The process also extracts oils from oil seeds in a simpler, more economical manner and provides high quality food grade oils. This invention involves the preparation of protein isolates by a procedure which decreases protein degradation and denaturing which has been caused by elevated temperatures in prior processes. The process also provides for extraction of substantially all oils and fats from the protein meal providing a cleaner, purer product with high levels of absorbable protein. The fats tend to interfere with the formation of the protein micelle. The process described herein eliminates the need to use the processes described in the patents described above, such as in U.S. Pat. No. 6,005,076, which are specifically designed to remove the fats so the micelles will form. Such protein isolates can then be used as such or added to formulated foods in order to increase the total protein content of that food. Proteins act to raise the overall nutritional quality of the product to which they have been added. The total cost of a particular protein is usually based on its combined nutritional and functional contribution to a finished product, i.e., premium prices are paid for high nutritional value and functionality. It is also believed that the protein produced and the oils recovered have compositions which are unique and unobtainable by prior processing methods. Accordingly, this patent is directed to unique new food product not previously produced. A still further advantage is that the extraction process, particularly when used to process canola, also extracts pigments in the meal which, if not removed, give the protein a green, brown or black color, thus eliminating the need for bleaching clays. Still further, the process relates to a method of extracting and isolating glucosinolates from the oil seed. This is important for the reasons discussed below. However, the glucosinolates can be recovered and used as a starting material for production as natural pesticides.

Canola meal is widely employed as a protein supplement in animal feed. The feeding value of canola meal is reduced due to the anti-nutritive effects of the breakdown products of the glucosinolates, which reduce feed intake and growth in non-ruminant animals. Glucosinolates in the seed are broken down during the prior developed extraction processes by the enzyme myrosinase to form isothiocyanates and nitrites. These breakdown products may also inhibit thyroid function, leading to goiter. The glucosinolate molecule has three components; glucose, a sulfate and a toxophore or aglycone which contains sulfur. The toxophor or aglycone is an organic toxic substance that remains after the glucose, sulfate, and some times the sulfur in the toxophore are hydrolyzed. The glucosinolate has the following general structure and breakdown products

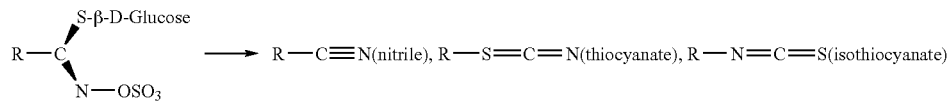

For example, the crambe plant (an oil seed from the mustard family), rapeseed and black mustard seed are (or could be) important sources of edible oils and protein meal for human and animal consumption. However, the high levels of glucosinolates in these seeds must be removed because of their toxic breakdown products. The process described herein is effective in removing the glucosinolates from the meal and in recovering these materials so that they can be processed to isolate their breakdown products which, in turn, can be applied to crops for their natural pesticide properties.

The feed value of canola meal is improved by reducing or eliminating glucosinolates from canola seeds. The present invention also relates to Brassica seeds, meal, plant lines and progeny thereof having a reduced level of glucosinolates. Other seeds with high levels of glucosinolates can be made suitable as food stocks by effective removal of the glucosinolates. Typical glucosinolate levels in canola meal and seed are disclosed in the following references: 1) Shahidi et al. Journal of Food Quality, 11, 421–431 (1989), and 2) Lichter et al., Plant Breeding 100, 209–221 (1988) and 3) Kraling et al., Plant Breeding, 105, 33–39 (1990). The typical range for the glucosinolates content of conventional *B. napus* double low canola varieties in μmol/g of seed at 40% oil content and 8.5% moisture is as follows:

| | |
|---|---|
| 2-hydroxy 3-butenyl glucosinolate | 2.40–7.32 |
| allyl glucosinolate | 0–1.16 |
| 2-hydroxy 4-pentenyl glucosinolate | 0–0.43 |
| 3-butenyl glucosinolate | 1.65–3.44 |
| 4-hydroxy 3-indolymethyl glucosinolate | 2.60–4.40 |
| 4-pentenyl glucosinolate | 0–1.14 |
| 3-indolylmethyl glucosinolate | 0–4.18 |
| Total glucosinolates | 12.06–18.23 |

Farmers in Canada began producing canola oil in 1968. Early canola cultivars were known as single zero cultivars because their oil contained 5 percent or less erucic acid, but glucosinolates were high. In 1974, the first licensed double zero cultivars (low erucic acid and low glucosinolates) were grown. Today all canola cultivars are double zero cultivars. Canola is an acronym for Canada Oil Low Acid. Canola has come to mean all rapeseed cultivars that produce oil with less than 2 percent erucic acid and meal with less than 30 μmol/g of glucosinolates.

However, the process disclosed herein, while particularly suitable for recovering edible oils and high absorbable-protein content meal from such Canola crops can also be used to produce such products (edible oil and high absorbable protein content) from other oil seed crops which may have normal unacceptable levels of glucosinolates.

Unprocessed canola typically contains from about $33\%_w$ to about $50\%_w$ oil, up to about $10\%_w$ fats, and from about $29\%_w$ to about $58\%_w$ protein. Soy bean has about 18% oil and $82\%_w$ protein.

The process according to the invention comprises cracking the seed, and preferably grinding the seed, to make the contents thereof (the oil and the pulp) accessible to the extraction solvent. However, any process to break apart the seed (comminute) to allow the solvent to permeate the source material may be used. Care must be taken in grinding the seed to minimize the temperature increase which occurs as a result of grinding process as the elevated temperatures may denature the protein in the seed. The seed may be crushed and at least some of the oil removed mechanically (by pressing). Removal of the oil is not necessary; however, doing so reduces the amount of oil which later has to be separated from the solvent. The cracked, ground or crushed seed is then exposed to liquid iodotrifluoromethane (ITFM) in a previously evacuated vessel at a temperature from about −20° C. to about 45° C., preferably at 15 to 35° C. for a period of time sufficient to remove the soluble materials (oils, fats etc.). The time necessary is dependent on numerous factors including particle size, flow rates, quantities of solvent and seed (ratio of solvent to seed volume), temperature, packing density and compressibility of the solids. The solvent/seed composition is maintained under its vapor pressure during the extraction phase to maintain the ITFM as a liquid. Typical pressures are from about 30 psi to about 120 psi, typical times are 1 minute to 24 hours and typical solvent to seed ratios are 1:1 to 10:1, which can be highly dependent on mixing rates, mass ratios or flow rates. A broad range of processing times would not reconsidered to be outside the scope of the invention. One skilled in the art can readily determine the temperature and pressure combination necessary to maintain the ITFM as a liquid using the enthalpy tables for ITFM.

The seed may be exposed to several aliquots of solvent until no more extractables are dissolved. Alternatively the extraction can be performed with a single larger amount of solvent or in a continuous process whereby the solvent is flowed through the cracked, crushed or ground seed.

Once the extraction step is complete the remaining undissolved material is separated from the oil/solvent solution (the liquid phase) and the undissolved material and the liquid solvent with dissolved constituents are processed separately. The undissolved material constitutes protein soluble in aqueous solvents, insoluble seed shell and starch and carbohydrates. Any residual solvent is readily removed therefrom by reducing the pressure to atmospheric at room temperature and, if necessary applying slightly elevated temperatures, a vacuum or a combination thereof, being carefully to moderate the use of elevated temperatures so as not to denature the highly soluble protein which has been separated from the oil, fats and other ITFM soluble components. Alternatively, an inert gas, such as nitrogen can be passed through the remaining material to remove any residual solvent.

The oil is processed in a similar manner. The ITFM with dissolved components is placed in a vessel and the pressure reduced so that the ITFM boils off leaving the oils, fats and other dissolved materials behind, referred to as crude oil. Any residual solvent can be removed by heating the crude oil to slightly elevated temperatures, applying a vacuum to the oil, using a combination of heat and vacuum, or passing an inert gas (i.e. $N_2$ etc.) through the extracted material. If it is desirable to separate the components of the crude oil, for example the fats and other recovered materials, a combination of ITFM with a less effective solvent, for example 1,1,1,2 tetrafluoroethane (HFC-134a) can be used to dissolve some of the constituents from the crude oil leaving behind some insoluble components. For example, most fatty acids are insoluble in HFC-134a while being readily soluble in ITFM. Therefore, the more HFC-134a added to the ITFM, the greater the amount of fat that will be left undissolved. Accordingly, by varying the ratio of ITFM to HFC-134a it is possible to fractionate the crude oil into oil of a greater or lesser purity. One skilled in the art will recognize that various different cosolvents or combinations of cosolvents with greater or lesser solvent ability than HFC-134a can be used to accomplish the intended fractionation of the crude oil.

A further alternative is to pass the ITFM with dissolved crude oil, prior to evaporating the solvent, through a chromatography column, so that the various of the components are retained on the column packing as the ITFM passes through the column. The retained components can then be eluted from the column using typical chromatography separation techniques.

A still further alternative is to add a less effective solvent, such as HFC-134a or other appropriate solvents or solvent mixture to the separated liquid phase causing same or all of the dissolved components (oils, fats, etc.) to separate out in to a separate, second liquid phase. This may be accomplished by flowing the crude oil through a column counter-current to said less effective solvent thus separating out various components based on their relative solubility.

EXAMPLE 1

Whole, unextracted canola bean was ground into a fine powder (without removal of the hull) to produce a raw meal. The raw meal was then extracted with iodo-trifluoro methane (ITFM), the various soluble oils and fats being removed in the solvent phase to leave a yellowish white processed meal containing small black particles from the ground shells. The meal was then air dried.

The extraction process comprises contacting the raw ground meal in a sealed container with ITFM at 17–18° C. at a pressure of 4 Atmospheres (60 psi). The sample of raw meal was extracted four times using about 150 g of clean ITFM per Kg of raw meal for each extraction, each time for about 1–3 minutes, the liquid phase from each extraction was collected and the solvent was evaporated from (separated from) the soluble oils and fats at 25° C. and atmospheric pressure. The solvent was then recondensed for future use. Any residual solvent in the processed meal was also evaporated at room temperature and pressure and collected for recycling.

The yield of ITFM soluble oils and fats was 40.8%

The processed meal is an oil free, substantially defatted material consisting of black pieces of hull and bright yellow pieces of Endosperm which readily separate from the hull pieces. When compared with a typical commercial canola meal which had been extracted using hexane, and then exposed to elevated temperatures needed to remove the hexane, the meal obtained using the ITFM extraction has a natural bright yellow color and does not show the typical discoloration of hexane extracted canola. The endosperm particles, whether in small pieces or clumps, appear to be held together solely by electrostatic attraction forces. As a result the protein portion of the meal can be readily disbursed and dissolved in aqueous solvents. In contrast, in commercial canola meal (hexane extracted), because of the desolventizing/toaster treatment typically applied, the endosperm is presented as hard, cooked spheres or clumps of endosperm and hulls stuck together, appearing like snow-balls, of a dirty yellow color. The hexane extract meal is difficult to dissolve in aqueous solvents.

The processed canola meal contained 41% protein which was highly soluble. This higher protein content, when compared to commercial meal, appears to be due to a much lower fat content, the fat having been dissolved in the ITFM extraction step. It also appears that the ratio of high molecular weight protein (360,000 daltons) to medium molecular weight proteins (160,000 daltons) is significantly greater than in hexane processed meal, probably due to the reduced degradation of the protein as a result of destructive processing conditions used in preparing commercial meal by hexane extraction, resulting in isolates with better functionality because of the increased micelle formation. The 360,000 dalton proteins are particularly suitable for the formation of micelles.

TABLE 1

| | COMMERCIAL MEAL | ITFM EXTRACTED MEAL |
|---|---|---|
| Appearance | Dirty yellow pieces of Endosperm in solid lumps with black pieces of hull strongly held together | Bright yellow pieces of Endosperm with black pieces of hull loosely held together |
| Protein content, % | 34–37 | 41 |
| Protein solubility in NaCl solution, mg/ml (in a 15% w/v mix of meal with salt water solution. | 15 | 29 |
| Residuals | 2–4% oil<br>8–12% fats<br>1% residual solvent | 0% oil<br>0% fat<br>≦1 ppm residual solvent |

According to a report issued by the Saskatchewan Canola Development Commission (SCDC) published in October 1999, since 1992 the yearly average protein content for canola meal used by the feed industry had a protein content of 34.75%. It is reported that the typical amount of soluble protein in commercially available canola meal ranges from 14.9% to 29%. SCDC also reported in October 1998 that the maximum available crude protein in canola meal is 42.3% and the maximum theoretical soluble protein (only a portion of the crude protein) is 32%. The difference between these values is due to the fact that some of the crude protein is naturally not readily digestible. Secondly, a significant additional portion of the theoretically soluble protein is made unavailable for digestion as a result of denaturing at elevated processing temperatures and the use of hexane as a solvent to remove the oils.

It has been found that the use of ITFM as a solvent to remove the oils and fats results in a canola meal with a protein content of better than 95% of theoretical (41/42.3) and a soluble protein content of better than 90% of theoretical (29/32). This finding is also applicable to the recovery of increased value grain meals using the process described above For example soy meal typically has a higher expected crude protein content than canola (49% v 42.3%) but a lower soluble protein content (20% v 32%). Using the process discussed herein the soluble protein content of soy meals, as well as the other protein-containing meals discussed above, can be significantly increased. As indicated above the process described herein can also be used on a wide variety of oil bearing seeds and grains to produce superior extracts. For example, the extraction process applied to barley recovers approximately 4.5% of the barley feed as a slightly green-colored clear oil. Barley oil is know to contain significant quantities of D-alpha-tocotrienol. When the process is used on flax seed approximately 30% of the starting material is recovered as a clear yellow solution in contrast with a dirty appearing brown-yellow oil recovered in the initial extraction steps of prior art processes.

It is believed these extracts are superior to those obtained by hexane or supercritical $CO_2$ extraction because the biomass and recovered oils are never exposed to the damaging effects of heat, light and oxygen, including the heat which may be generated during pressing operations. The oils obtained are believed to be at least equivalent to, if not superior to that collected by expeller pressing because all processing is conducted at ambient (or lower) temperatures.

In contrast, while hexane extraction produces very high oil yields, the average lipid peroxide levels are higher than in oils processed by the mechanical pressing method. Thus, the oil recovered by hexane extraction can have a poor stability and a bland, bitter aftertaste. Supercritical $CO_2$ extraction can be an even more damaging process than hexane extraction. The seeds are first ground to a meal and then mashed. Intense pressure is then applied in the presence of liquified carbon dioxide gas. This process takes from 90 to 300 minutes and the seeds may be exposed to temperatures between 165–200 degrees F. The resultant oil is reported to be highly susceptible to accelerated rancidity. In addition, the important phosphatide components are refined out, mineral content reduced, and the fatty acid content unfavorably altered. Flax oil produced by supercritical $CO_2$ loses its normal taste characteristics and may be bitter.

It is evident from the foregoing that there are many additional embodiments of the present invention which, while not expressly described herein, are within the scope of this invention and may suggest themselves to one of ordinary skill in the art. It is therefore intended that the invention be limited solely by the appended claims.

What we claim is:

1. A process of preparing a protein containing meal comprising:

providing a protein source material in a form that will allow a liquid extraction solvent applied thereto to permeate said protein source material, mixing the protein source material with the liquid extraction solvent comprising iodotrifluoromethane in combination with a cosolvent to dissolve solvent soluble constituents of the protein source material, forming a liquid phase and a solid phase, such mixing being conducted in a closed pressurized vessel, separating the liquid phase from the solid phase, removing the solvent from the liquid phase to leave an oil based extract and removing the solvent from the solid phase to leave a dry, protein containing meal.

2. The process of claim 1 wherein the protein source material is crushed, cracked, ground or otherwise comminuted to allow the solvent to permeate said protein source material.

3. The process of claim 1 wherein the solvent and protein source material are mixed together for a period of from about 1 minute to about 90 minutes at a temperature of from about −20° C. to about 45° C.

4. The process of claim 3 wherein the solvent and protein source material are mixed together for a period of from about 5 minutes to about 50 minutes.

5. The process of claim 3 wherein the solvent and protein source material are mixed together for at a temperature of from about 15° C. to about 35° C.

6. The process of claim 1 wherein a first quantity of the solvent is mixed with the protein source material for a period of from about 1 to 3 minutes at a temperature of from about 17° C. to about 18° C., the liquid phase is separated from the solid phase, and one or more additional quantities of the solvent are mixed with the protein source material under substantially the same conditions, and the liquid phase so produced is removed and added to the first collected liquid phase.

7. The process of claim 1 wherein the pressure of the vessel during mixing is the vapor pressure of the solvent at the processing temperature, said pressure being adequate to maintain the solvent as a liquid.

8. The process of claim 1 wherein the solvent is removed from the liquid phase and the solid phase by placing each of the solid phase and the liquid phase in separate sealed containers, reducing the pressure above each of the liquid phase and the solid phase to cause the solvent to vaporize, and collecting the evaporated solvent by transferring said vaporized solvent to a refrigerated container, causing the vaporized solvent to condense into a liquid.

9. The process of claim 1 wherein the co-solvent is HFC-134a.

10. The process of claim 1 wherein the co-solvent is added to the liquid phase after separation of the liquid phase from the solid phase.

11. The process of claim 1 wherein the protein source material is rapeseed, canola, soy, barley or flax seed or bean.

* * * * *